(12) United States Patent
Mandavilli et al.

(10) Patent No.: US 8,572,234 B2
(45) Date of Patent: Oct. 29, 2013

(54) MPLS VPN FAULT MANAGEMENT USING IGP MONITORING SYSTEM

(75) Inventors: Swamy J. Mandavilli, Fort Collins, CO (US); Dipankar Gupta, Fort Collins, CO (US); Srikanth Natarajan, Fort Collins, CO (US); Sunil Menon, Cupertino, CA (US); Anil A. Kuriakose, Kottayam (IN); Chris Schleicher, Fort Collins, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 2323 days.

(21) Appl. No.: 10/998,819

(22) Filed: Nov. 30, 2004

(65) Prior Publication Data

US 2006/0114838 A1  Jun. 1, 2006

(51) Int. Cl.
*G06F 15/173* (2006.01)

(52) U.S. Cl.
USPC .......................................... 709/224; 709/223

(58) Field of Classification Search
USPC ....................................................... 709/224
See application file for complete search history.

(56) References Cited

U.S. PATENT DOCUMENTS

| | | | | |
|---|---|---|---|---|
| 7,315,897 | B1 * | 1/2008 | Hardee et al. | 709/229 |
| 2002/0030864 | A1 * | 3/2002 | Chaudhuri et al. | 359/110 |
| 2002/0133756 | A1 * | 9/2002 | Jain | 714/43 |
| 2003/0204619 | A1 * | 10/2003 | Bays | 709/238 |
| 2003/0212927 | A1 * | 11/2003 | Navar et al. | 714/47 |
| 2004/0015583 | A1 * | 1/2004 | Barrett et al. | 709/224 |
| 2004/0223500 | A1 * | 11/2004 | Sanderson et al. | 370/395.53 |
| 2006/0039364 | A1 * | 2/2006 | Wright | 370/352 |
| 2006/0056328 | A1 * | 3/2006 | Lehane et al. | 370/315 |
| 2007/0110079 | A1 * | 5/2007 | Schollmeier et al. | 370/400 |
| 2008/0084890 | A1 * | 4/2008 | Kompella | 370/400 |

FOREIGN PATENT DOCUMENTS

| | | |
|---|---|---|
| EP | 1246415 A2 | 10/2002 |
| WO | WO03/081845 A3 | 10/2003 |

OTHER PUBLICATIONS

N. Dubois et al. Benefits of Monitoring Routing Protocols in Live Networks. 2004 IEEE Workshop on IP Ops & Mgmt Proceed pp. 9-15.
EP Search Report, re: GB0522161.9, Search Dt. Feb. 23, 2006.
Route Explorer, Packet Design, http://www.packetdesign.com/products/mpls-vpn.htm, 2 pages, published in 2004.
MPLS—Protocol Label Switching, http://www.protocols.com/papers/mpls.htm, 2 pages, published Jan. 1998.

(Continued)

*Primary Examiner* — Kevin Mai

(57) ABSTRACT

In an exemplary embodiment, a method for managing a network includes monitoring a network using an interior gateway protocol to detect change in the network, and determining effects of the detected network change on Multi Protocol Label Switching paths in the network. For example, the MPLS paths can be the same as IGP best paths. An exemplary embodiment includes managing a Multi Protocol Label Switching network by discovering edge routers in the Multi Protocol Label Switching network, determining possible combinations of Multi Protocol Label Switching path end points based on services provided within the network, selecting discovered edge routers for observation, based on the determined possible combinations, monitoring the selected edge routers, and determining status of Multi Protocol Label Switching paths in the network based on the monitoring.

21 Claims, 3 Drawing Sheets

(56) References Cited

OTHER PUBLICATIONS

MPLS, What is MPLS?—A Word Definition From the WEbopedia Computer Dictionary., http://www.webopedia.com/term/m/mpls.html, 2 pages, published Aug. 7, 2002.
Route Explorer, Packet Design, Harnessing the Intelligence of IP, www.packetdesign.com/products/packet-primary-R4.pdf, 4 pages.
NetworkWorldFusion, MPLS (Multi Protocol Label Switching), Vortex 2004, Oct. 4-6, 2004, Santa Barbara, CA, http://www.nwfusion.com/details/483.html, 4 pages, Aug. 20, 2004.
MPLS—Multi-Protocol Label Switching, http://www.xilinx.com/esp/networks_telecom/optical/net_tech/mpls.htm, 2 pages, Aug. 20, 2004.
Tag Switching Protocols, 2 pages, http://www.protocols.com/pbook/tag.htm, Aug. 20, 2004.

* cited by examiner

MPLS VPN FAULT MANAGEMENT USING IGP MONITORING SYSTEM

BACKGROUND

Multiprotocol Label Switching (MPLS), an IETF initiative, combines or integrates Layer 2 information about network links (bandwidth, latency, utilization) with Layer 3 information (e.g. Internet Protocol information), to simplify and improve IP-packet exchange. MPLS can be implemented for example within a particular system or network.

Via MPLS, IP (Internet Protocol) traffic can be steered on a variety of paths instead of one single path, for example a single path discovered by an interior gateway protocol such as Border Gateway Protocol (BGP). Thus MPLS can provide network operators with flexibility to route traffic around local malfunctions or problems such as congestion, bottlenecks, link failures, and can be used to enable or guarantee particular class or level of service.

IP packets include a header field containing a precise address to which the packet is to be routed. MPLS generates a short fixed-length label that acts as a shorthand representation of an IP packet's header. This is analogous to a U.S. mail ZIP code that represents a region encompassing a city (or portion thereof), street and street number, and which is used to make forwarding decisions about the mail piece (or in the case of MPLS, the IP packet). Packets are forwarded along a Label Switched Path (LSP) where each Label Switch Router (LSR) makes forwarding decisions based solely on the contents of the packet's MPLS label. At each hop, the LSR strips off the existing label from the MPLS header and applies a new label which tells the next hop how to forward the packet. In contrast to MPLS, traditional routing methods through networks cause the precise address information to be evaluated at every router in a packet's path through the network.

MPLS switches and routers or Label Switch Routers (LSRs) evaluate packets and then affix labels to the packets based for example on packet destination. The LSRs assign each packet a label that corresponds to a particular path through the network. Thus all packets assigned the same label, will travel the same path, termed a Label Switched Path (LSP). Labels refer to paths, not endpoints. Thus, packets destined for the same endpoint (e.g., bearing the same IP address) can arrive via different LSPs.

Specifically, the first MPLS device that an IP packet encounters when entering a network, for example a Label Edge Router (LER), can encapsulate or mark the IP packet with a label. The LER analyzes contents of the packet's IP header and then selects an appropriate label to encapsulate the packet. In selecting the label, the MPLS edge router can consider other factors besides the destination address carried in the IP header, for example, type-of-service parameters, and/or other criteria such as Virtual Private Network membership. Subsequent nodes within the network then use the MPLS label (not the IP header) to make forwarding decision for the packet. When MPLS labeled packets leave the network, an edge router removes the labels.

LSPs are somewhat similar to circuit-switched paths in ATM or Frame Relay networks, except that they do not depend on a particular Layer 2 technology. An LSP can be established that crosses multiple Layer 2 transports such as ATM (Asynchronous Transfer Mode), Frame Relay or Ethernet.

MPLS can benefit IP-based networks, for example by a) providing an ability to set the path that the traffic will take through the network, b) providing a mechanism to implement IP based Virtual Private Networks (VPNs) without need for encryption or end-user applications, and c) eliminating multiple layers. Using MPLS, carriers can transfer functions of the ATM control plane to Layer 3, thereby simplifying network management and reducing network complexity. MPLS paths can be based on IGP (Interior Gateway Protocol) best paths, and MPLS VPN traffic can use IGP best effort paths.

SUMMARY

An exemplary embodiment includes a method for managing a network including monitoring a network to detect change in the network via an interior gateway protocol, and determining effects of the detected network change on Multi Protocol Label Switching paths in the network.

An exemplary embodiment includes a method for managing a Multi Protocol Label Switching network including discovering edge routers in the Multi Protocol Label Switching network, determining possible combinations of Multi Protocol Label Switching path end points based on services provided within the network, selecting discovered edge routers for observation based on the determined possible combinations, monitoring the selected edge routers, and determining status of Multi Protocol Label Switching paths in the network based on the monitoring.

An exemplary system for managing a Multi Protocol Label Switching network includes a mechanism for discovering edge routers in the Multi Protocol Label Switching network, a mechanism for monitoring the selected edge routers, and a mechanism for determining status of Multi Protocol Label Switching paths in the network based on the monitoring.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
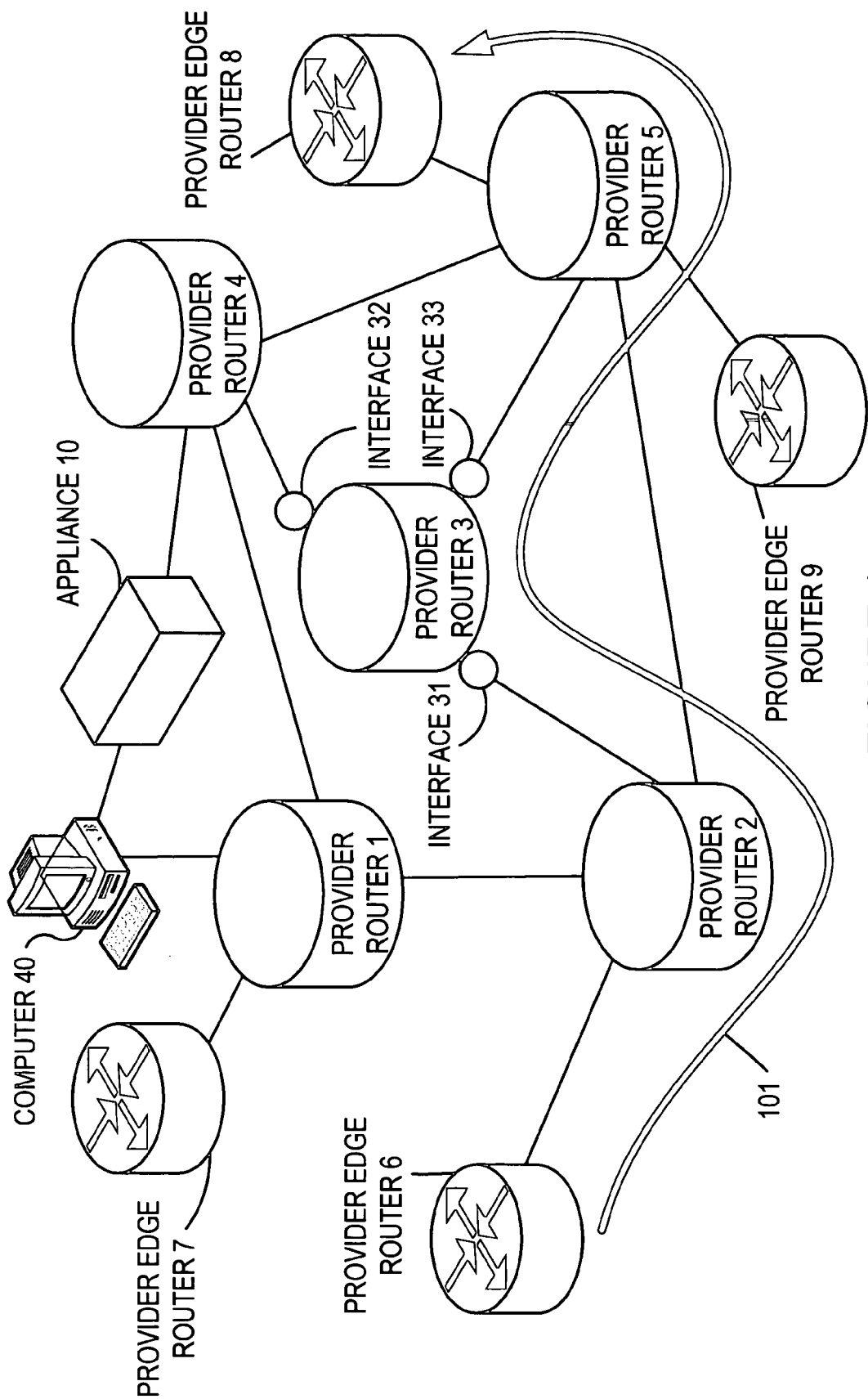
FIG. 1 illustrates an exemplary network configuration.

FIG. 1 illustrates an exemplary network configuration wherein an appliance 10 is connected to a network that includes provider routers 1, 2, 3, 4 and 5 and also provider edge routers 6, 7, 8, 9. As shown in FIG. 1, provider router 3 includes an interface 31 linked to provider router 2, an interface 33 linked to provider router 5, and an interface 32 linked to provider router 4. The provider router 4 is also linked to each of the provider routers 1 and 5 and the appliance 10. The provider edge routers 8 and 9 are each linked to the provider router 5, the provider edge router 6 is linked to the provider router 2, and the provider edge router 7 is linked to the provider router 1. The provider router 2 is also linked to the provider routers 1 and 5.

Figure 2:
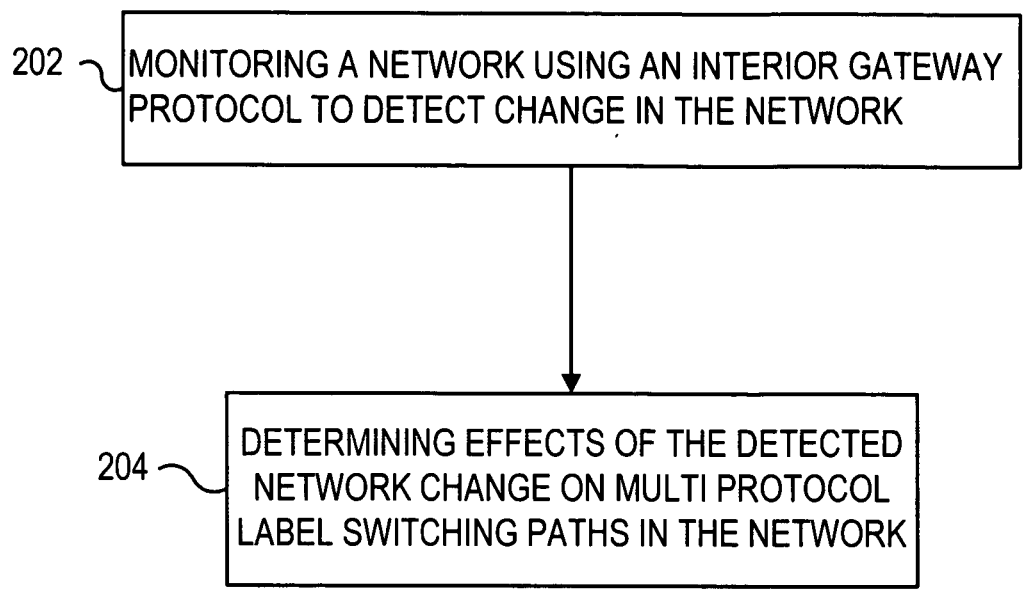
FIG. 2 illustrates an exemplary embodiment.

An exemplary embodiment includes the method shown in FIG. 2 which can be applied to the configuration shown in FIG. 1, in a first block 202 the network is monitored using an Interior Gateway Protocol to detect change in the network. The Interior Gateway Protocol can be, for example, OSPF (Open Shortest Path First), IS-IS (Intermediate System to Intermediate System), BGP (Border Gateway Protocol), EIGRP (Enhanced Interior Gateway Routing Protocol), or any other suitable protocol. From block 202, control proceeds to block 204, where effects of a detected network change on MPLS (Multi Protocol Label Switching) paths in the network are determined.

Figure 3:
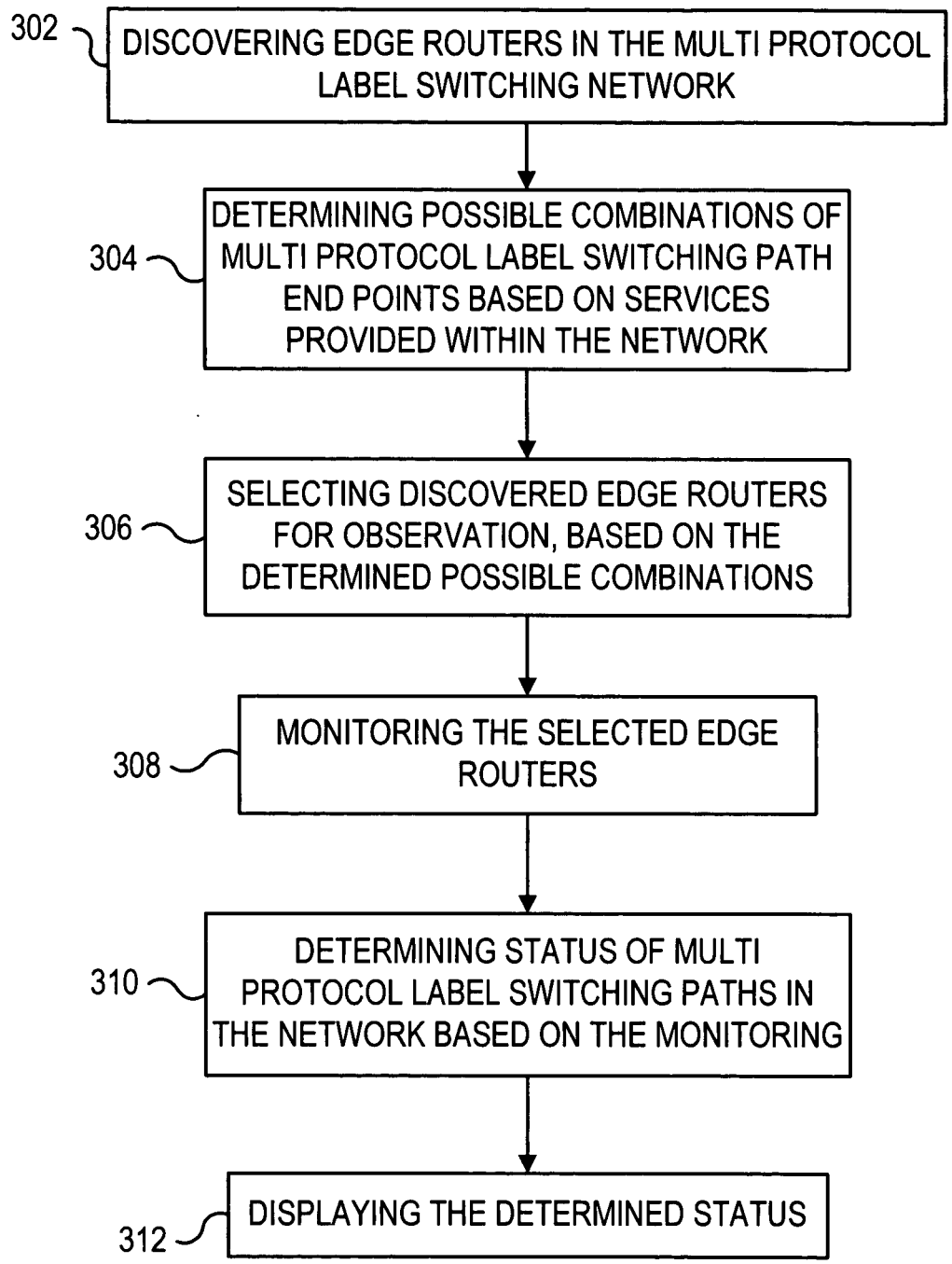
FIG. 3 illustrates an exemplary embodiment.

An exemplary embodiment includes the method shown in FIG. 3. In a first block 302, edge routers in an MPLS network are discovered, for example based on services such as VPN (Virtual Private Network). Discovery can be performed using SNMP techniques or other techniques, by the appliance 10, the computer 40, by an agent operating within the network or using resources of the network, for example in connection with the appliance 10 and/or the computer 40. In a next block 304, possible combinations of MPLS path end points are determined based on services provided within the network, for example VPN (Virtual Private Network), TE, and so forth. From block 304, control proceeds to block 306, where discovered edge routers or provider edge routers are selected for observation, based on the determined possible combinations. The combinations can be, for example, pairs of routers. For example, the provider edge routers 6, 8 shown in FIG. 1 can be selected for observation. In accordance with an exemplary embodiment, some but not all of the discovered edge routers or provider edge routers are selected for observation. In accordance with an exemplary embodiment, user selections of edge routers can alternatively or additionally be received. Functions described with respect to block 304, 306 can be variously performed by the appliance 10, the computer 40, by an agent operating within the network or using resources of the network, for example in connection with the appliance 10 and/or the computer 40, or by other mechanisms. From block 306 control proceeds to block 308, where the selected edge routers (for example, selected pairs of edge routers) are monitored, thereby monitoring a path or paths between the selected edge routers. In an exemplary embodiment, the monitored paths are IGP best effort paths. This monitoring can be performed for example by the appliance 10, or by agents operating in connection with the appliance 10 and/or the computer 40 or any other appropriate mechanism. From block 308, control proceeds to block 310, where status of MPLS paths in the network is determined based on the monitoring, for example based on the monitored status of IGP best effort paths. From block 312, control proceeds to block 312, where the determined status is displayed, for example on a screen of the computer 40 shown in FIG. 1. In an exemplary embodiment, the effect of the determined status on VPNs influenced or affected by the MPLS paths is also determined and displayed, for example in the blocks 310, 312 respectively.

In an exemplary embodiment, all of the MPLS paths are the same as IGP paths or IGP best effort paths. In exemplary embodiments of the invention, at least some of the MPLS paths are presumed to be IGP paths or IGP best effort paths. IGP can form a layer underneath MPLS, where the MPLS is a transport/middle layer, and a service layer such as VPN can be formed above the MPLS layer. Thus an IGP problem can give rise to an MPLS problem which can impact the VPN. Monitoring the IGP layer in accordance with exemplary embodiments described herein can indicate health or status of the MPLS layer and corresponding effect(s) on the VPN layer. Thus when an IGP problem or problem in the IGP layer occurs, in accordance with exemplary embodiments the impact of this problem on MPLS (and layers above MPLS) can be determined or evaluated.

The methods shown in FIGS. 2-3 can be implemented using the appliance 10 shown in FIG. 1, which can be a Hewlett Packard Company "RAMS" product that is used in accordance with exemplary embodiments described herein. Packet Design Incorporated's Route Explorer application can also be used as a basis for the appliance 10. The appliance 10 can masquerade or behave as or emulate a router and receive and listen for protocol messages indicating status and configuration of the network, for example by behaving as an IGP (Interior Gateway Protocol) router so that it receives all IGP announcements and thus has a full picture of the network, including changes to the network. For example, if in the configuration of FIG. 1 the provider edge routers 6, 8 are selected and monitored, then a change in status of either interface 31 or 33 of the provider router 3 will alert the appliance 10 that the MPLS path 101 shown in FIG. 1 is affected. As shown in FIG. 1, the MPLS path 101 extends from the provider edge router 6, to the provider router 2, to the provider router 3, to the provider router 5, and then to the provider edge router 8. The appliance 10 can then generate an SNMP trap, for example, including information identifying the source for the path (the provider edge router 6 in this case), the destination of the path (provider edge router 8), a change in the path status (up/down/improved/degraded), and also a root cause (e.g., interface 31 on provider router 3 has gone down). A management solution, running for example on a management station within or connected to the network, for example in the provider router 4, in the appliance 10, or in the computer 40 shown in FIG. 1, can receive information from the appliance 10, for example via an SNMP trap generated by the appliance as described herein (for example with respect to a problem or event in the IGP layer), and based on the information, determine or estimate how MPLS paths, VPNs (Virtual Private Networks) and/or VPN-to-provider edge router/ router relationship(s), in particular MPLS paths that are the same as IGP best effort paths, will be affected by the situation reported via the trap. In an exemplary embodiment, the management solution receives information identifying MPLS paths from known or conventional mechanisms that create or establish MPLS paths, and/or from the appliance 10. Thus the management solution can use this knowledge of MPLS paths, together with information about network changes reported via IGP, to discern effects of the network changes on MPLS paths and associated mechanisms or subnets, VPNs that use or are affected by the MPLS paths.

By way of background information, a VRF (VPN routing/ forwarding instance) includes an IP routing table, a derived forwarding table, a set of interfaces that use the forwarding table, and a set of rules and routing protocols that determine what goes into the forwarding table. In general, a VRF includes the routing information that defines a customer VPN site that is attached to a PE router.

If, for example, a first VPN1 and a second VPN2 have a logical VRF-neighboring relationship via the provider edge router 6 and the provider edge router 9, then the management solution can discern that a failure of the interface 33 on the provider router 3 will take down an MPLS path between the provider edge routers 6, 9 and severely impact VPN1 and VPN2. In this instance, the management solution can generate an alarm or alert message flagging this situation, and can also store status information regarding the MPLS path and VPNs in question. The alarm or alert message can indicate, for example, location and nature of the problem is, and which MPLS paths and VPNs are affected, and what alternate paths are available (for example, routing the MPLS path to pass directly between provider route 2 and provider router 5) or in use, as well as historic path information (e.g. paths used/ established in the past). The alert message, as well as status of MPLS paths in the network and any information available to the management solution, can be displayed to the user, for example via a screen of the computer 40.

The methods, logics, techniques and pseudocode sequences described above can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. A computer readable medium can include software or a computer program or programs for causing a computing device to perform the methods and techniques described herein.

Those skilled in the art will appreciate that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for managing a network, comprising:
   selecting, based on virtual private network ("VPN") services, a set of edge routers to monitor at an interior gateway protocol layer of the network, the selected set of routers comprising fewer than all the edge routers of the network;
   monitoring the set of edge routers at an interior gateway protocol layer of the network and using an interior gateway protocol message to detect change in the network; and
   determining effects of the detected network change on Multi Protocol Label Switching paths in the network.

2. The method of claim 1, further comprising selecting only path end point edge routers for monitoring.

3. The method of claim 1, wherein the interior gateway protocol is Border Gateway Protocol.

4. The method of claim 1, wherein the edge routers monitored are determined by user selection.

5. The method of claim 1, wherein a monitoring device monitors the network by listening for interior gateway protocol data.

6. The method of claim 5, wherein the monitoring device monitors the network by monitoring simple network management protocol traps.

7. The method of claim 6, wherein the monitoring device discovers the network.

8. The method of claim 5, wherein the monitoring device monitors the network by monitoring selected label edge routers in the network.

9. The method of claim 8, comprising the monitoring device generating an alert when a change in the network is detected.

10. The method of claim 9, wherein the alert is a Simple Network Management Protocol trap.

11. The method of claim 1, wherein the Multi Protocol Label Switching paths are Interior Gateway Protocol best effort paths.

12. A method for managing a Multi Protocol Label Switching network, comprising:
    discovering edge routers in the Multi Protocol Label Switching network based on virtual private network ("VPN") services;
    determining possible combinations of Multi Protocol Label Switching path end points based on VPN services provided within the network;
    selecting discovered edge routers for monitoring at an interior gateway protocol layer of the network, based on the determined possible combinations, the discovered edge routers comprising fewer than all edge routers of the network;
    monitoring the selected edge routers at an interior gateway protocol layer of the network; and
    determining status of Multi Protocol Label Switching paths in the network based on an interior gateway protocol message received as part of the monitoring.

13. The method of claim 12, wherein the selecting comprises receiving selections of edge routers from a user.

14. The method of claim 12, wherein the Multi Protocol Label Switching paths are Interior Gateway Protocol best effort paths.

15. A system for managing a Multi Protocol Label Switching network, comprising:
    a computer configured for discovering edge routers in the Multi Protocol Label Switching network based on virtual private network ("VPN") services;
    processor means for monitoring edge routers selected from the discovered edge routers at an interior gateway protocol layer of the network, the selected edge routers comprising fewer than all edge routers of the network; and
    processor means for determining status of Multi Protocol Label Switching paths in the network based on the monitoring.

16. A non-transitory computer readable medium storing a computer program for causing a computer to perform:
    selecting, based on virtual private network ("VPN") services, a set of edge routers to monitor at an interior gateway protocol layer of the network;
    monitoring the set edge routers at an interior gateway protocol layer of the network and using an interior gateway protocol message to detect change in the network;
    determining effects of the detected network change on Multi Protocol Label Switching paths in the network; and
    monitor the network by listening for interior gateway protocol data, and wherein the Multi Protocol Label Switching paths are Interior Gateway Protocol best effort paths;
    wherein the computer program causes the computer to monitor the network by monitoring fewer than all label edge routers in the network.

17. The medium of claim 16, wherein the computer program causes the computer to monitor the network by monitoring simple network management protocol traps.

18. The medium of claim 16 wherein the computer program causes the computer to discover the network.

19. The medium of claim 16, wherein the computer program causes the computer to generate an alert when a change in the network is detected.

20. A non-transitory computer readable medium storing a computer program for causing a computer to perform:
    discovering edge routers in a Multi Protocol Label Switching network based on virtual private network ("VPN") services;
    determining possible combinations of Multi Protocol Label Switching path end points based on VPN services provided within the network;
    selecting discovered edge routers for monitoring at an interior gateway protocol layer of the network, based on the determined possible combinations, the selected discovered edge routers comprising fewer than all the edge routers of the network;

monitoring the selected edge routers at an interior gateway protocol layer of the network; and determining status of Multi Protocol Label Switching paths in the network based on an interior gateway protocol message received as part of the monitoring.

21. The medium of claim 20, wherein the Multi Protocol Label Switching paths are Interior Gateway Protocol best effort paths.

\* \* \* \* \*

UNITED STATES PATENT AND TRADEMARK OFFICE
CERTIFICATE OF CORRECTION

PATENT NO.          : 8,572,234 B2                        Page 1 of 1
APPLICATION NO.     : 10/998819
DATED               : October 29, 2013
INVENTOR(S)         : Swamy J. Mandavilli et al.

It is certified that error appears in the above-identified patent and that said Letters Patent is hereby corrected as shown below:

On the Title page, in item (73), Assignee, in column 1, line 1, delete "Development," and insert -- Development Company, --, therefor.

Signed and Sealed this
Eleventh Day of February, 2014

Michelle K. Lee
*Deputy Director of the United States Patent and Trademark Office*